(12) United States Patent
L'Aot et al.

(10) Patent No.: US 7,010,913 B2
(45) Date of Patent: Mar. 14, 2006

(54) BRAKING SYSTEM, IN PARTICULAR FOR A MOTOR VEHICLE

(75) Inventors: Jean-Michel L'Aot, Saint Denis (FR); Philipppe Come, Senlis (FR); Remi Demersseman, Paris (FR); Sylvain Lenczner, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 10/780,324

(22) Filed: Feb. 17, 2004

(65) Prior Publication Data

US 2005/0103009 A1  May 19, 2005

(30) Foreign Application Priority Data

Feb. 19, 2003 (FR) .................................. 03 02312

(51) Int. Cl.
  *F15B 7/10* (2006.01)
(52) U.S. Cl. .................................................. 60/585
(58) Field of Classification Search ................ 60/585; 220/309.1, 310.1, 379; 248/635, 609
  See application file for complete search history.

(56) References Cited

U.S. PATENT DOCUMENTS

| 2,095,752 | A | * | 10/1937 | La Brie | 60/587 |
| 2,241,188 | A | * | 5/1941 | Burns | 60/585 |
| 4,217,922 | A | * | 8/1980 | Come | 60/592 |
| 4,346,865 | A | * | 8/1982 | Murata | 248/311.2 |
| 5,826,845 | A | * | 10/1998 | Lounsbury et al. | 248/635 |
| 6,098,949 | A | * | 8/2000 | Robinson | 248/635 |

\* cited by examiner

*Primary Examiner*—Edward K. Look
*Assistant Examiner*—Igor Kershteyn
(74) *Attorney, Agent, or Firm*—Leo H McCormick & Warren Comstock

(57) ABSTRACT

A supply device for a braking system, comprising at least one reservoir (2) for supplying a master cylinder, and a rigid support (4) for the reservoir (2), characterized in that the reservoir (2) and the fastening support (4) comprise male (26) and female (28) elements collaborating with one another, and in that elastic sleeves (30) are inserted between the male elements (26) and the female elements (28).

12 Claims, 5 Drawing Sheets

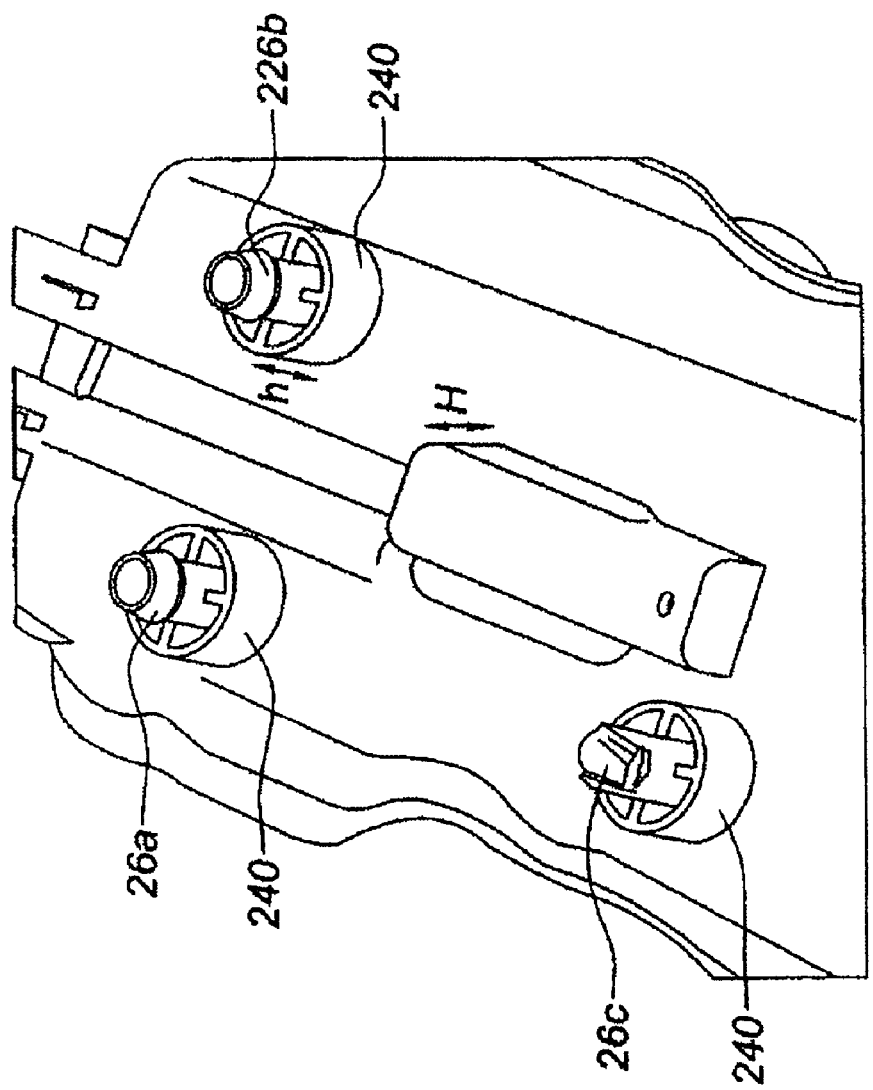

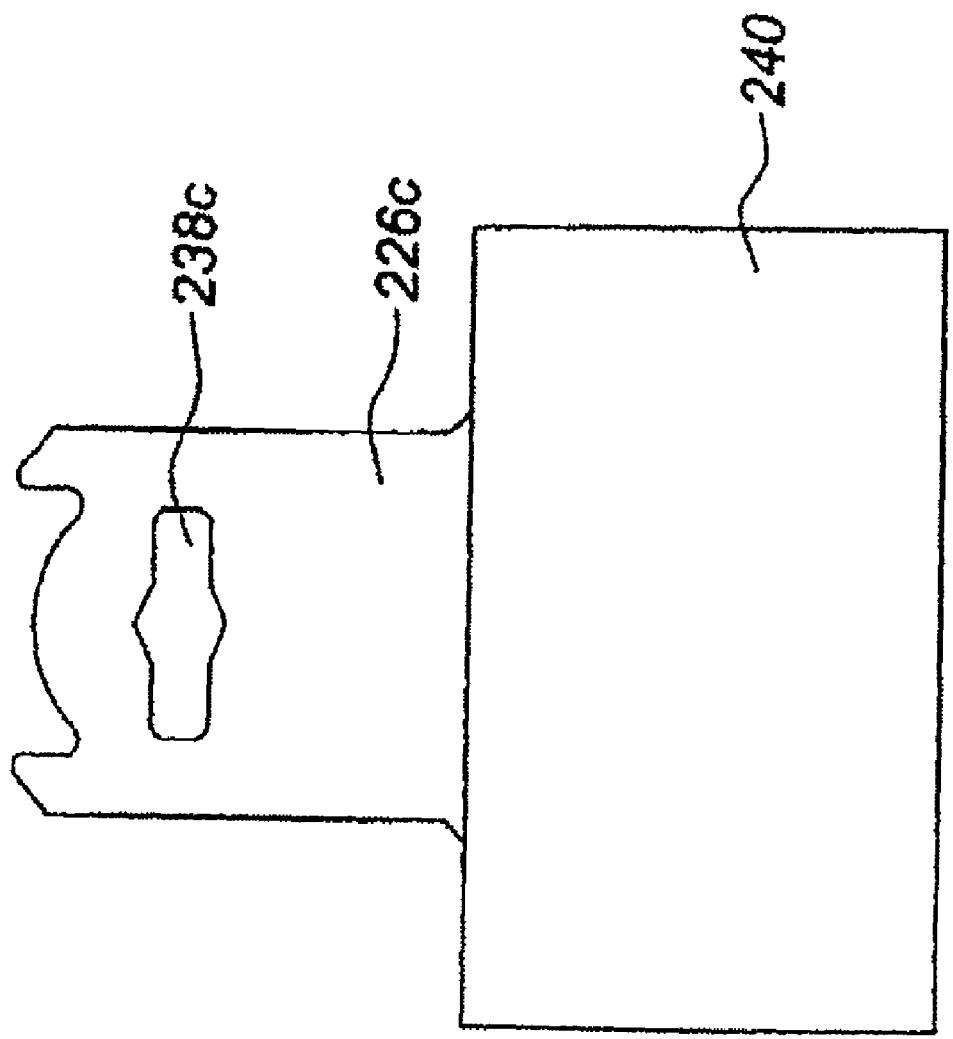

BRAKING SYSTEM, IN PARTICULAR FOR A MOTOR VEHICLE

The present invention relates mainly to a braking system, in particular for a motor vehicle, and to a method of installing such a system.

Braking system supply systems comprising a brake fluid reserve formed by a first main brake fluid reservoir arranged at a distance from the master cylinder and by a second reservoir fastened to the master cylinder are known. The first and second reservoirs are made of rigid plastic, for example polypropylene. The first and second reservoirs are mounted rigidly on a fixed element of the engine compartment of the motor vehicle and on the master cylinder, respectively.

In particular, the first reservoir is provided, for example, with one or more fastening tabs and the fixed element is formed by a plate provided with slideways into which the fastening tabs of the first reservoir are latched. This fastening causes the reservoir to be placed under permanent stress in order to produce a rigid attachment of the reservoir so as to prevent the reservoir from becoming detached or from vibrating.

However, during the life of the vehicle, the material making up the reservoir tends to deform (expand), this phenomenon being all the more rapid because the reservoir is subjected to numerous vibrations resulting from the movement of the vehicle and from the operation of the engine.

The deformation of the reservoir thus reduces the rigidity of the attachment between the reservoir and its support, and this can weaken its connection with the second reservoir and also generate noise.

Furthermore, the actual installation requires a high degree of precision to place the fastening tabs opposite the slideways, which entails a long installation time.

It is consequently one object of the present invention to offer a supply system for a braking system with a high level of reliability.

It is another object of the present invention to offer a supply system for a braking system with a low sound level.

It is another object of the present invention to offer a supply system for a braking system with simplified installation.

These objects are achieved by a supply device for a braking system, having a first main reservoir fastened to a support secured to the body of a motor vehicle, and a second reservoir mounted on a reservoir-supporting master cylinder, the first reservoir comprising studs penetrating into openings made in the reservoir, the diameter and position of which openings are tailored to the studs of the first reservoir.

In other words, the fastening of the first reservoir to the support is rigid enough to keep the reservoir in place and flexible enough not to exert stress on said reservoir.

The main subject of the present invention is a supply device of braking fluid for a braking system, comprising at least one reservoir for supplying a master cylinder, and a rigid support for said reservoir, the said reservoir comprising means for flow of braking fluid in braking system and comprises first attachment means able to collaborate with second attachment means borne by the rigid support, the first attachment means and the second attachment means comprising male and female elements collaborating with one another, and elastic means being inserted between the male elements and the female elements characterized in that the means for flow of braking fluid and the first attachment means are separate.

Another subject of the present invention is a supply device characterized in that the male elements are formed by at least one stud, advantageously three studs, projecting from a lower wall of the reservoir, in that the female elements are orifices made in the rigid support and in that the elastic means are sleeve-shaped.

Another subject of the present invention is a supply device characterized in that the studs comprise means for locking the attachment of the reservoir to the rigid support.

Another subject of the present invention is a supply device characterized in that the means for locking at least one stud are formed by an annular bulge at an end of the stud that is remote from the lower wall of the reservoir, the outside diameter of said bulge being greater than the inside diameter of the sleeve so that, when the stud is introduced into the sleeve, the bulge is disposed on the opposite side from the lower wall of the reservoir with respect to the sleeve and forms a stop in the direction for extracting the stud from the sleeve.

Another subject of the present invention is a supply device characterized in that the means for locking at least one stud are formed by a transverse passage made at an end of the stud that is remote from the lower wall of the reservoir and by a pin intended to penetrate into the passage so that, when the stud is introduced into the sleeve, the passage is disposed on the opposite side from the lower wall of the reservoir with respect to the sleeve and so that the pin introduced into said passage forms a stop in the direction for extracting the stud from the sleeve.

Another subject of the present invention is a supply device characterized in that the reservoir comprises, projecting from its lower wall, a housing for receiving a brake fluid detector, and in that the rigid support has roughly the shape of an L defining a cutout for receiving said housing.

Another subject of the present invention is a supply device characterized in that the reservoir comprises, projecting from its lower wall, a housing for receiving a brake fluid detector, and in that a spacer is inserted between the stud and the lower wall of the reservoir, said spacer having a height h equal to the height H of the housing and an outside diameter greater than the inside diameter of the sleeve in order to bear against said sleeve.

Another subject of the present invention is a supply device characterized in that the studs are integrally formed with the reservoir.

Another subject of the present invention is a supply device characterized in that the sleeves are made of elastomer.

Another subject of the present invention is supply device characterized in that the rigid support is a plate fastened in an engine compartment of a motor vehicle.

Another subject of the present invention is a supply device according to the present invention, characterized in that the reservoir is a main reservoir remote from the braking circuit, and in that the system also comprises a secondary reservoir arranged near the braking circuit and connected to the main reservoir, said secondary reservoir comprising pipes for supplying a master cylinder.

Another subject of the present invention is a method of installing the supply device according to the present invention, characterized in that it comprises, inter alia, the steps of:

fastening the rigid support in the motor vehicle;

introducing the sleeves into the orifices of the rigid support; and introducing the studs into said sleeves.

An advantage of the present invention is that it does not require a high level of precision when installing the supply system and it allows rapid installation without having to resort to special tools.

The present invention will be better understood with the aid of the description below and of the appended figures.

BRIEF DESCRIPTION OF THE DRAWINGS

FIG. 3a is a partial view from below of a detail of a third exemplary embodiment of a braking device according to the present invention; and FIG. 3b is a detail view of FIG. 3a.

DETAILED DESCRIPTION OF THE INVENTION

Figure 1:
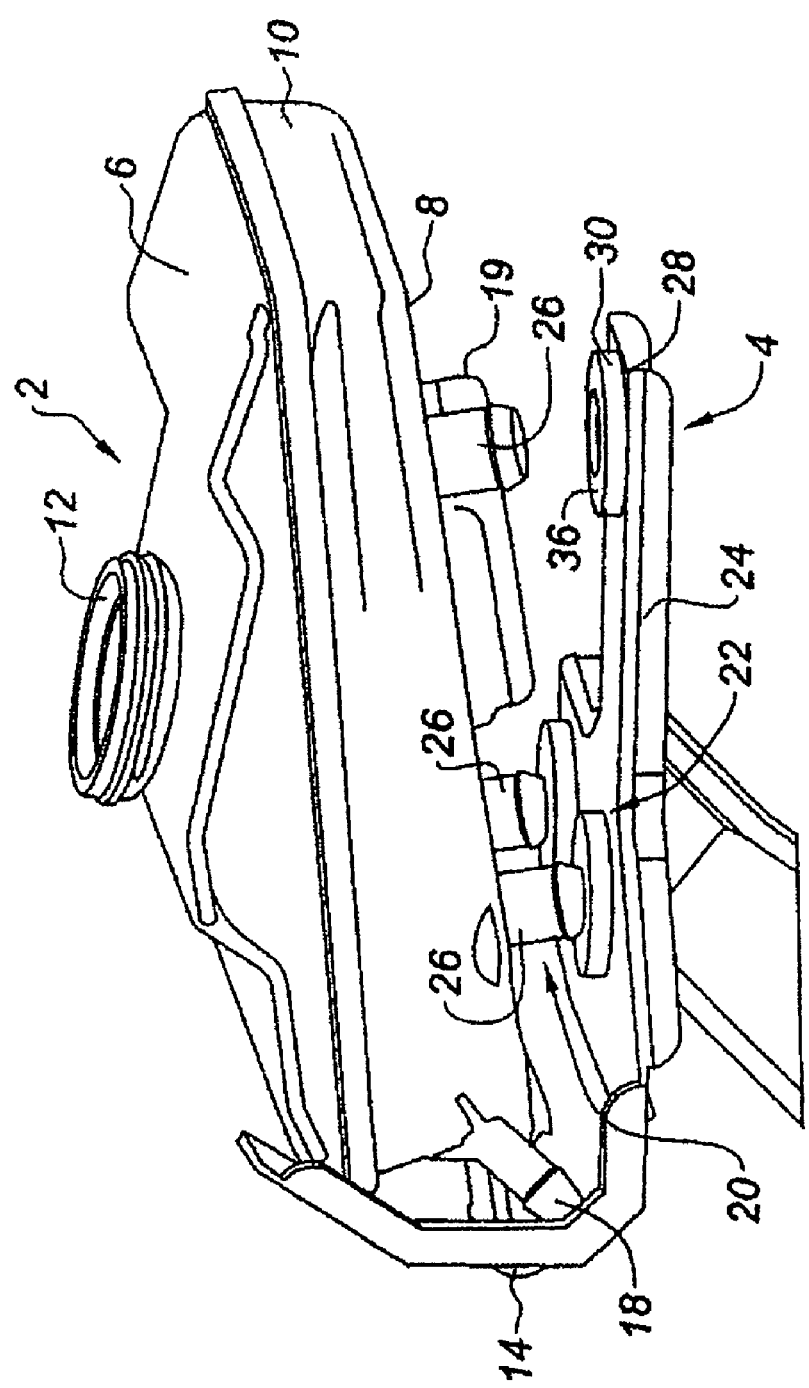
FIG. 1 is a side view of a first example and preferred exemplary embodiment of a braking device according to the present invention.

FIG. 1 shows a braking device according to the present invention, comprising a main reservoir 2, a secondary reservoir (not shown) and a rigid support 4 fastened in an engine compartment of a motor vehicle (not shown).

The main reservoir 2 has an approximately parallelepipedal shape bounded by an upper wall 6 and a lower wall 8 that are connected by a peripheral wall 10. The upper wall has an orifice 12 for filling the reservoir with fluid, the orifice being closed off by a cap (not shown); a vent is provided in the upper part of the reservoir [lacuna] the appearance of a reduced pressure in the reservoir during the flow of the brake fluid in the braking circuit.

The main reservoir also comprises first pipes 14 for connecting the main reservoir 2 to the secondary reservoir by means of tubes, advantageously hoses, the pipes being integrally formed with the peripheral wall 10 of the reservoir, the reservoir also advantageously comprising second pipes 18 for connection to the clutch circuit.

The main reservoir comprises a brake fluid level detector (not shown) mounted in a housing 19 that projects outwardly from the lower wall 8 of the reservoir.

The secondary reservoir comprises pipes for supplying a master cylinder connected to the brakes arranged on the wheels of a motor vehicle.

The main reservoir 2 also comprises first attachment means 20 collaborating with second attachment means 22 borne by the rigid support 4.

The rigid support 4 is formed by a plate 24, for example made of steel sheet, having sufficient thickness to form a rigid support for the main reservoir 2, and provided with an arm lying in a plane substantially orthogonal to the plane of the plate 24 and intended to be fastened to a motor vehicle, for example, by a system of nuts and bolts or by welding. In the example shown, the plate 24 has roughly the shape of an L so as to leave a space for the brake fluid detector housing 21.

In the example shown, the first attachment means 20 borne by the main reservoir are formed by the at least one stud, advantageously three studs 26, integrally formed with the lower wall 8 of the main reservoir. The second attachment means 22 comprise orifices 28 made in the plate 24 and arranged so as to collaborate with the studs 26 borne by the reservoir. The orifices 28 have an inside diameter that is substantially larger than the outside diameter of the studs 26 and are bordered by a sleeve 30 made of elastic material having an inside diameter that is smaller than the outside diameter of the studs 26.

On its outer wall, the sleeve has a groove bordering the orifice 28 that ensures that said sleeve 30 is retained axially in the orifice 28.

The studs are force-fitted into the sleeves. However, because of the elasticity of the packing 30 of the orifices 28, the studs are not subjected to transverse stress along the axis of the studs 26, and, consequently, do not risk becoming deformed over time, nor cause a clearance to appear in the attachment of the reservoir 2 to the rigid support. The studs 26 also advantageously comprise means for locking the attachment between the reservoir and the plate 24.

Advantageously, the force required for positioning the studs in the sleeves is between 80 newtons and 120 newtons, and the force to be exerted for withdrawing the studs from the sleeves is between 200 newtons and 250 newtons.

The sleeves are made, for example, of elastomer, plastomer, a blend thereof, or an alloy thereof.

The studs 26 comprise, at their end facing the plate 24, an annular bulge 32 coaxial with the axis of the stud so that, when the stud 26 has penetrated into the sleeve 30, the bulge is in abutment with a face of the sleeve that is directed away from a face 36 of the sleeve in contact with the lower wall of the reservoir 2. In the example shown, the bulge is continuous, but it goes without saying that it is possible to provide a bulge formed by sectors that are distributed over the periphery of the stud.

The outside diameter of the annular bulge 32 is determined so as, on the one hand, to facilitate penetration of the stud 26 into the sleeve 30 and, on the other, to prevent the stud 26 from being withdrawn from the sleeve 30.

By way of example, the diameter of the studs 26 is 13 mm, the outside diameter of the bulge 32 borne by the studs 26 is 14.25 mm, the outside diameter of the groove made in the sleeve 30 is 13.9 mm, and the diameter of the orifices in the support plate is also 13.9 mm. These examples of numerical values are not limiting in any instance. In fact, the dimensioning of the reservoir and, consequently, of the attachment means depends on the size of the braking circuit and on the functions that it is to perform.

Figure 2:
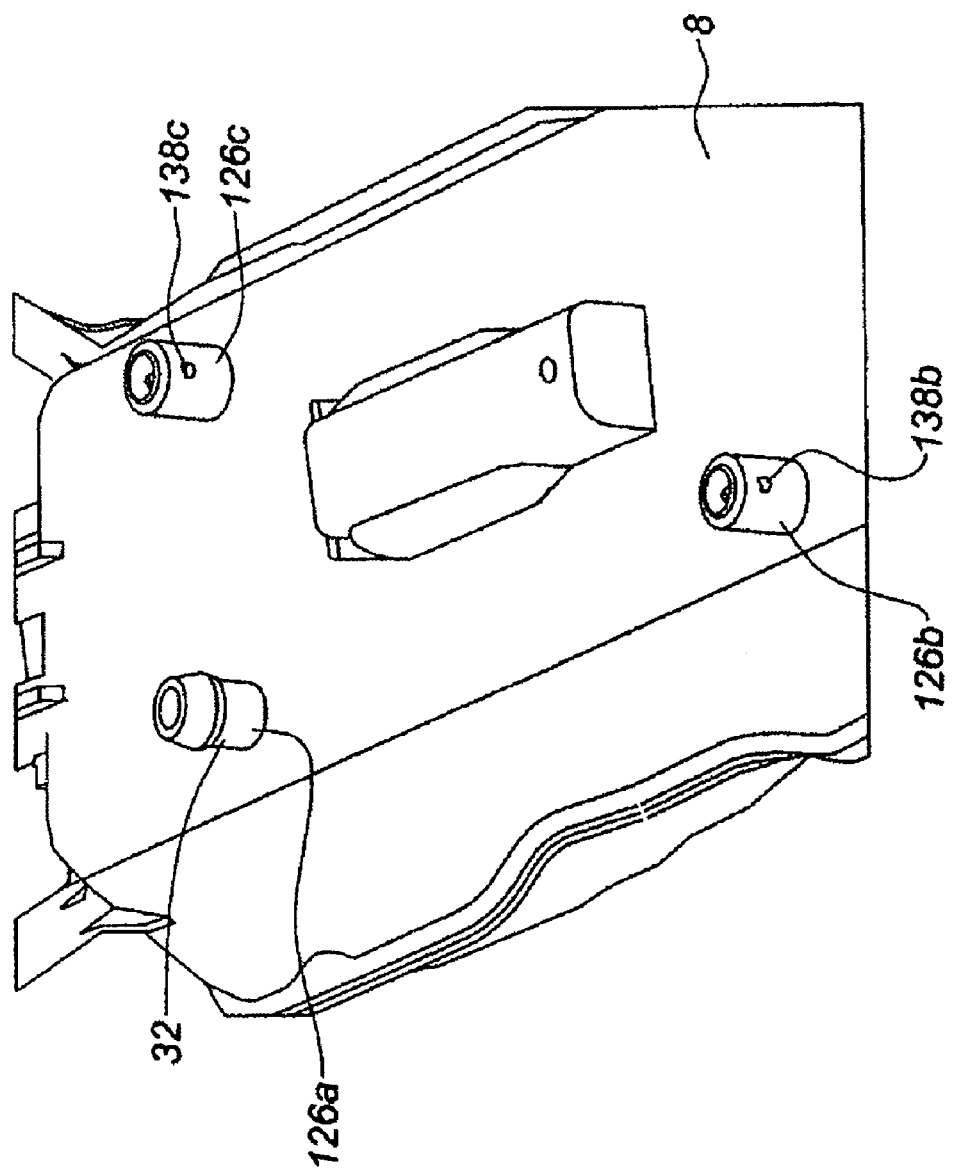
FIG. 2 is a partial view from below of a detail of a second example of a braking device according to the present invention.
Figure 2B:
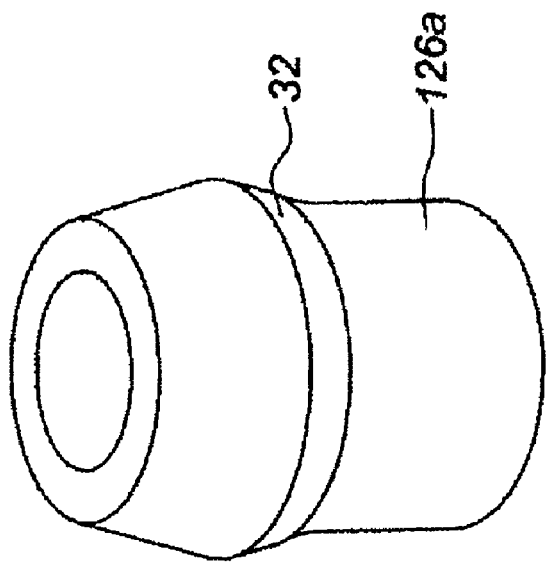
FIGS. 2a, 2b are detail views of FIG. 2.
Figure 2A:
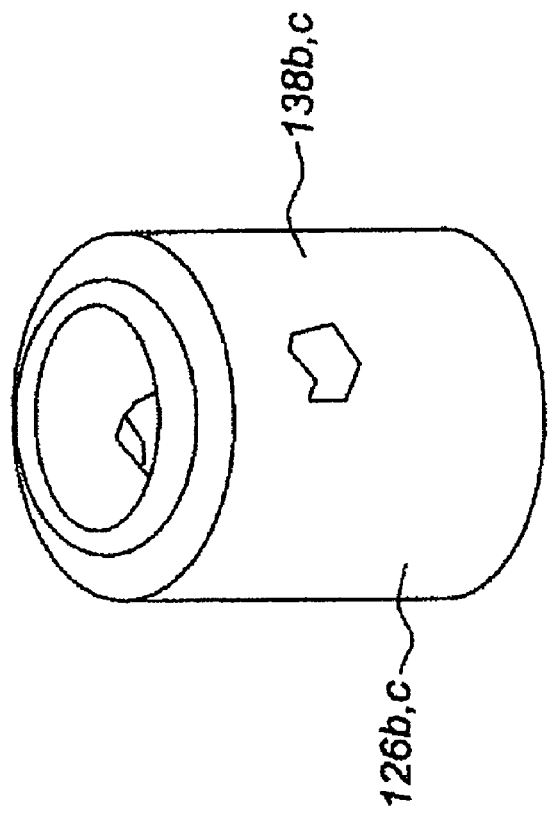

In FIGS. 2a and 2b, the reservoir comprises a first stud 126a, similar to those described above, provided with an annular locking bulge 32, and a second and third stud 126b and 126c that are pierced with a respective passage 138b, 138c that is disposed transversely with respect to the axis of the stud so that, when the studs have penetrated into the sleeves 30, the passage 138b, 138c is situated at the opposite side from the lower wall of the reservoir with respect to the sleeve 30 and so that a pin (not shown) may be positioned in the passage 138b, 138c so as to prevent the reservoir from moving with respect to the plate 24.

In FIGS. 3a and 3b, the reservoir comprises a first and a second stud 226a, 226b provided with an annular bulge, and a third stud 226c provided with a passage intended for receiving a locking pin 238c. The studs 226a, 226b, 226c also comprise an annular spacer 240 having an outside diameter that is greater than the inside diameter of the sleeves 30 and a height h equal to the height H of the housing 21 for the brake fluid detector 19, said spacer facing the lower wall of the reservoir. Thus, it is no longer necessary to provide a plate 24 comprising a cutout for the housing 21.

The reservoir is, for example, made of transparent polypropylene by molding an upper shell and a lower shell that are connected in a sealed manner, for example by adhesive bonding.

A description will now be given of the method of installing the system for supplying a braking circuit according to the present invention.

The method of installation comprises, inter alia, the steps:
fastening the plate 24 in the engine compartment;
placing the sleeves 30 in the orifices 28; and
causing the studs to penetrate into the sleeves 30 by exerting a force on the reservoir in the direction of the plate 24 until the lower wall 8 of the reservoir or the lower face of the spacers 240 comes into contact with the plate 24.

The method advantageously comprises the step of placing a pin in each transverse duct made in the studs for the reservoirs provided with sleeves capable of receiving this pin.

A reliable supply device that can be installed rapidly and has a long service life has duly been produced.

It is clear that the present invention is not restricted to the exemplary embodiments shown in the figures.

It is conceivable to arrange the sleeves 30 around the studs and to introduce the studs surrounded by the sleeves into the orifices made in the support plate 24.

It is also conceivable to arrange studs on the plates and cavities for receiving the studs in the lower wall of the reservoir.

In the examples shown, the sleeves are added components; however, it is possible to produce, during a single molding operation, the elastic sleeves on the studs or in the cavities using thermoplastic elastomers.

It is also possible to replace the pin by an elastic ring fitted into a groove made on the outer periphery of the stud.

It is also conceivable to have a reservoir comprising only studs provided with a transverse passage intended to receive a pin.

It is clear that the present invention is not restricted to supply devices comprising a main reservoir and a secondary reservoir, but applies equally to supply systems comprising a single reservoir fastened to a master cylinder; in this case, the second fastening means intended to collaborate with the first fastening means for the reservoir are made in the body of the master cylinder.

The present invention applies in particular to the motor industry.

The present invention applies mainly to the motor vehicle braking industry.

We claim:

1. A supply device of braking fluid for a braking system, comprising at least one reservoir (2) for supplying a master cylinder, and a rigid support (4) for said reservoir (2), the said reservoir (2) comprising means (14) for flow of braking fluid in braking system and comprises first attachment means (20) able to collaborate with second attachment means (22) borne by the rigid support (4), the first attachment means (20) and the second attachment means (22) comprising male (26) and female (28) elements collaborating with one another, and elastic means (30) being inserted between the male elements (26) and the female elements (28) characterized in that the means (14) for flow of braking fluid and the first attachment means (20) are separate.

2. The supply device according to claim 1, characterized in that the male elements are formed by at least one stud (26), projecting from a lower wall (8) of the reservoir (2), in that the female elements are orifices (28) made in the rigid support and in that the elastic means (30) are sleeve-shaped.

3. The supply device according to claim 2, characterized in that the studs comprise means for locking the attachment of the reservoir (2) to the rigid support (4).

4. The supply device according to claim 3, characterized in that the means for locking at least one stud (26) are formed by an annular bulge (32) at an end of the stud that is remote from the lower wall (8) of the reservoir, the outside diameter of said bulge (32) being greater than the inside diameter of the sleeve (30) so that, when the stud (26) is introduced into the sleeve (30), the bulge is disposed on the opposite side from the lower wall (8) of the reservoir with respect to the sleeve (30) and forms a stop in the direction for extracting the stud from the sleeve.

5. The supply device according to claim 3, characterized in that the means for locking at least one stud are formed by a transverse passage (138b, 138c) made at an end of the stud (126b, 126c) that is remote from the lower wall (8) of the reservoir (2) and by a pin intended to penetrate into the passage (138b, 138c) so that, when the stud (26) is introduced into the sleeve (30), the passage (138b, 138c) is disposed on the opposite side from the lower wall (8) of the reservoir with respect to the sleeve (30) and so that the pin introduced into said passage (138b, 138c) forms a stop in the direction for extracting the stud (126b, 126c) from the sleeve.

6. The supply device according to claim 5, characterized in that the reservoir comprises, projecting from its lower wall (8), a housing (21) for receiving a brake fluid detector (19), and in that the rigid support (4) has roughly the shape of an L defining a cutout for receiving said housing.

7. The supply device according to claim 5, characterized in that the reservoir (2) comprises, projecting from its lower wall (8), a housing (21) for receiving a brake fluid detector (19), and in that a spacer (240) is inserted between the stud (226a, 226b, 226c) and the lower wall (8) of the reservoir, said spacer (240) having a height (h) equal to the height (H) of said housing (21) and an outside diameter greater than the inside diameter of the sleeve (30) in order to bear against said sleeve.

8. The supply device according to claim 7, characterized in that the studs (26) are integrally formed with the reservoir (2).

9. The supply device according to claim 8, characterized in that the sleeves (30) are made of elastomer.

10. The supply device according to claim 9, characterized in that the rigid support (4) is a plate fastened in an engine compartment of a motor vehicle.

11. The supply device according to claim 10, characterized in that the reservoir (2) is a main reservoir remote from the braking circuit, and in that the system also comprises a secondary reservoir arranged near the braking circuit and connected to the main reservoir, said secondary reservoir comprising pipes for supplying a master cylinder.

12. The supply device according to claim 11, characterized by being installed in a supply system, inter alia, the steps of:
fastening the rigid support (4) in the motor vehicle;
introducing the sleeves (30) into the orifices (28) of the rigid support (4); and
introducing the studs (26) into said sleeves (30).

* * * * *